United States Patent
Caubet et al.

(10) Patent No.: US 6,602,049 B2
(45) Date of Patent: Aug. 5, 2003

(54) COMPRESSOR STATOR HAVING A CONSTANT CLEARANCE

(75) Inventors: Jean-Pierre Caubet, Dammarie-les-Lys (FR); Daniel Dao, Savigny-le-Temple (FR); Antoine Jean, Melun (FR); Didier Merville, Breuillet (FR)

(73) Assignee: Snecma Moteurs, Paris (FR)

( * ) Notice: Subject to any disclaimer, the term of this patent is extended or adjusted under 35 U.S.C. 154(b) by 0 days.

(21) Appl. No.: 09/953,143

(22) Filed: Sep. 17, 2001

(65) Prior Publication Data

US 2002/0061249 A1 May 23, 2002

(30) Foreign Application Priority Data

Sep. 18, 2000 (FR) .............................. 00 11856

(51) Int. Cl.[7] .............................................. F04D 29/44
(52) U.S. Cl. ...................................................... 415/160
(58) Field of Search .................... 415/159, 160, 415/161, 162, 148, 173.1

(56) References Cited

U.S. PATENT DOCUMENTS

| | | | |
|---|---|---|---|
| 2,412,365 A | 12/1946 | Sollinger | 415/160 |
| 2,606,713 A | 8/1952 | Bauger | 415/160 |
| 2,671,634 A | 3/1954 | Morley | 415/160 |
| 2,999,630 A | 9/1961 | Warren et al. | 415/149.4 |
| 3,685,921 A | 8/1972 | Dekeyser | 415/159 |
| 4,013,377 A | 3/1977 | Amos | 415/161 |
| 4,979,874 A | 12/1990 | Myers | 415/160 |
| 5,601,401 A | 2/1997 | Matheny et al. | 415/160 |

FOREIGN PATENT DOCUMENTS

| | | |
|---|---|---|
| DE | 1 300 194 | 7/1969 |
| EP | 0 298 894 | 1/1989 |
| EP | 0 965 727 | 12/1999 |
| FR | 2 599 785 | 12/1987 |
| FR | 2 608 678 | 6/1988 |
| FR | 2 746 141 | 9/1997 |
| GB | 1 276 720 | 6/1972 |

*Primary Examiner*—Edward K. Look
*Assistant Examiner*—Dwayne J. White
(74) *Attorney, Agent, or Firm*—Oblon, Spivak, McClelland, Maier & Neustadt, P.C.

(57) ABSTRACT

In a turbomachine compressor stator comprising a plurality of variable-pitch vanes (36), each vane mounted in rotation, about an axis of pivoting (38), in a wall (34) forming a surface of revolution about a longitudinal central axis of rotation of the turbomachine (32), being inclined by a specified angle (α) with respect to a plane perpendicular to this longitudinal central axis, there is provision for this wall to be machined locally opposite an end part of each vane (42) so as to form a spherical portion or pocket (40) whose center is positioned on the axis of pivoting and whose radius is determined so as to ensure, over the entire range of operation of the vane, a predetermined minimum clearance between this end part of each vane and the opposite machined spherical pocket while limiting the depth of machining of this pocket.

5 Claims, 3 Drawing Sheets

VIEW ALONG B

VIEW ALONG A

COMPRESSOR STATOR HAVING A CONSTANT CLEARANCE

FIELD OF THE INVENTION

The present invention relates to the specific field of turbomachines and is more particularly concerned with a disposition of the aerodynamic flow duct of a compressor stator of these turbomachines.

PRIOR ART

In a turbojet or a turboprop (referred to in the subsequent description as a turbomachine), it is known that the use of variable-pitch airfoils improves the general efficiency of the engine. Such is the case for the variable-pitch vanes of the compressor. However, it is also known that the clearance existing between the ends of these vanes and the walls of the flow duct has an adverse influence on this efficiency, a large clearance being a significant source of losses. Indeed, with variable-pitch vanes, the losses increase in proportion to the rotation of these vanes. French Patent Application No. 2 443 577 dealt with this problem and in order to solve it proposed a specific disposition of the inner aerodynamic flow duct. Unfortunately, this disposition suffers from two major drawbacks. Firstly, it necessitates an inclination of the axis of pivoting of the pivot of the vane at the level of the outer duct, and subsequently, the machining of the inner duct over an entire circumference, by hampering the flow between the vanes (through the creation of turbulence), introduces unnecessary losses of efficiency.

SUBJECT AND DEFINITION OF THE INVENTION

A subject of the present invention is a turbomachine compressor stator, the disposition of whose flow duct makes it possible to obtain an appreciable improvement in both efficiency and surge margin (flow separation limit) as compared with the prior art devices. An aim of the invention is also to propose a compressor stator allowing optimization of this efficiency over the entire range of operation of the vanes, from their open angular position to their closed angular position.

These aims are achieved by a turbomachine compressor stator comprising a plurality of variable-pitch vanes, each vane mounted in rotation, about an axis of pivoting, in a wall forming a surface of revolution about a longitudinal central axis of rotation of the turbomachine, being inclined by a specified angle $\alpha$ with respect to a plane perpendicular to the said longitudinal central axis, characterized in that the said wall is machined locally opposite an end part of each of the vanes so as to form a plurality of spherical portions or pockets whose respective centres are positioned on the said axes of pivoting and whose radii are determined so as to ensure, over the entire range of operation of the vanes, a predetermined minimum clearance between the said end part of the vane and the said spherical portion of opposite machined wall whilst limiting the depth of machining of this spherical portion.

The said end part of the vane is machined with a shape complementary to that of the said spherical pocket so as to ensure a constant clearance between the said wall and the said end part of the vane.

With this particular structure, a constant and minimum clearance can easily be obtained over the entire range of operation of the vanes.

According to a preferred embodiment, the said wall is the outer wall, or casing, of the compressor stator, the said end part of the vane being the upper end of this vane. Preferably, the said upper end part is a part of the vane overhanging at the rear, also known as the heel, connected with a trailing edge of this vane. Advantageously, the compressor stator furthermore comprises an unmachined part between two adjacent spherical pockets.

The invention also relates to any compressor of a turbomachine comprising a compressor stator such as described above.

BRIEF DESCRIPTION OF THE DRAWINGS

The characteristics and advantages of the present invention will become more apparent from the following description, given by way of nonlimiting indication, in conjunction with the appended drawings in which.

DETAILED DESCRIPTION OF A PREFERRED EMBODIMENT

Figure 4:
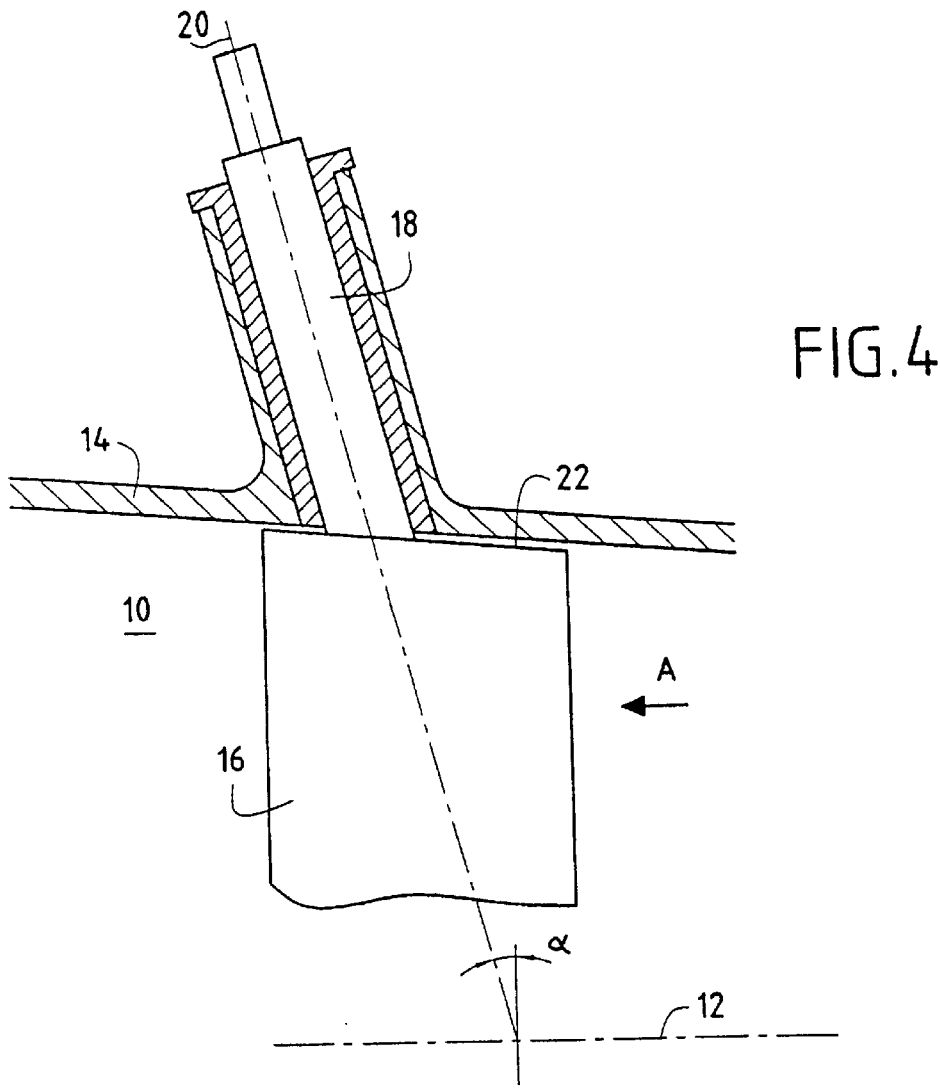
FIG. 4 is an axial sectional view of a vane upper part connected with the corresponding outer part of the flow duct of a turbomachine compressor according to the prior art.

FIG. 4 is a sectional view of a part of an annular flow duct 10 situated around a longitudinal central axis 12 of a turbomachine of the prior art and delimited at its outer part by a wall 14 forming a surface of revolution about this longitudinal axis. In this annular flow duct there is a variable-pitch aerodynamic vane 16. This vane can rotate about an axis of pivoting by way of its upper pivot 18 (controlled in rotation by a mechanism which is not represented), between a closed position and an open position, about an axis of rotation 20 orientated radially and inclined by a specified angle $\alpha$ with respect to a plane perpendicular to the longitudinal central axis 12. Typically, the annular duct 10 has a conical configuration with a downstream reduction in cross section with respect to the direction of flow and the vane illustrated may, for example, be any one of the vanes of a row of vanes (also called a straightener) of a compressor stator of the turbomachine.

Figure 5:
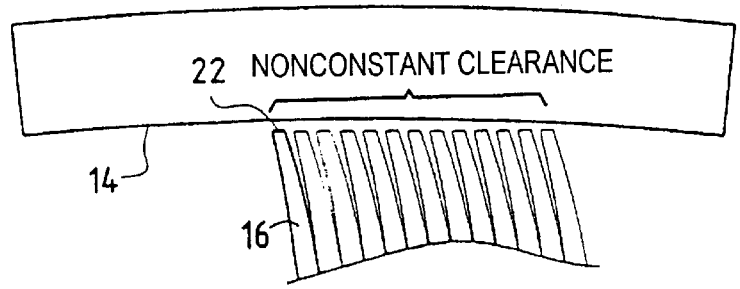
FIG. 5 is a view along B of FIG. 4 for various angular positions of a vane.

As illustrated in FIG. 5, which is a view along A of FIG. 4 and which shows various angular positions of a vane 16 between its closed position (on the left in the figure) and its open position (on the right in the figure), the existing clearance between the upper end 22 of the vane and the outer wall 14 of the duct facing it is not constant and varies during the pivoting of this vane, the minimum clearance corresponding in general to the two aforesaid closed and open positions. Between these two extreme angular positions, the clearance is not optimized and the losses of efficiency are therefore particularly significant.

Figure 1:
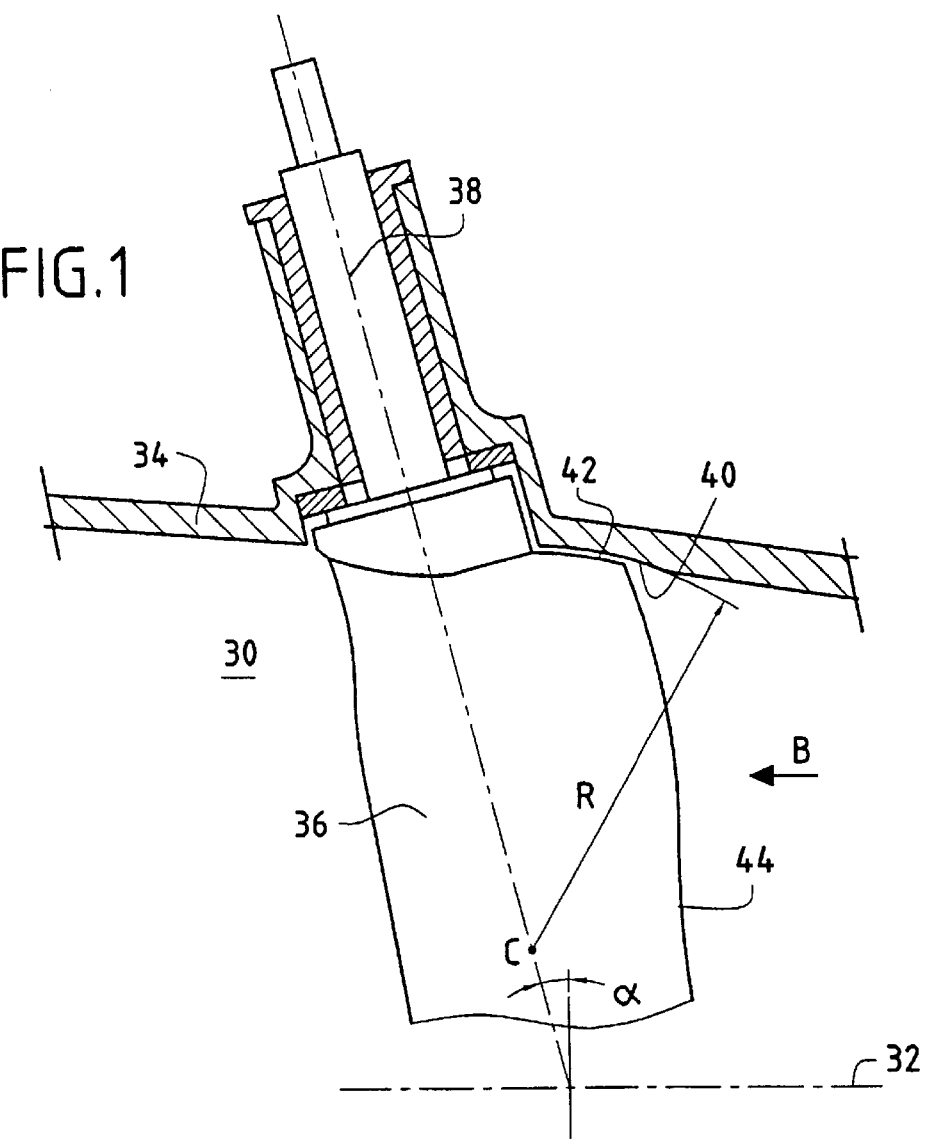
FIG. 1 is an axial sectional view of a vane upper part connected with the corresponding outer part of the flow duct of a turbomachine compressor according to the invention.

FIG. 1 is a longitudinal sectional view of a part of an annular flow duct 30 disposed in such a way as to guarantee a constant and minimum clearance over the entire range of operation of the vane of a turbomachine compressor stator according to the invention. As before, this duct of longitudinal axis 32 is delimited at its outer part by a wall 34, also referred to as the casing, in which a vane 36 is mounted in rotation, about an axis of pivoting passing through its upper pivot 38.

Figure 3:
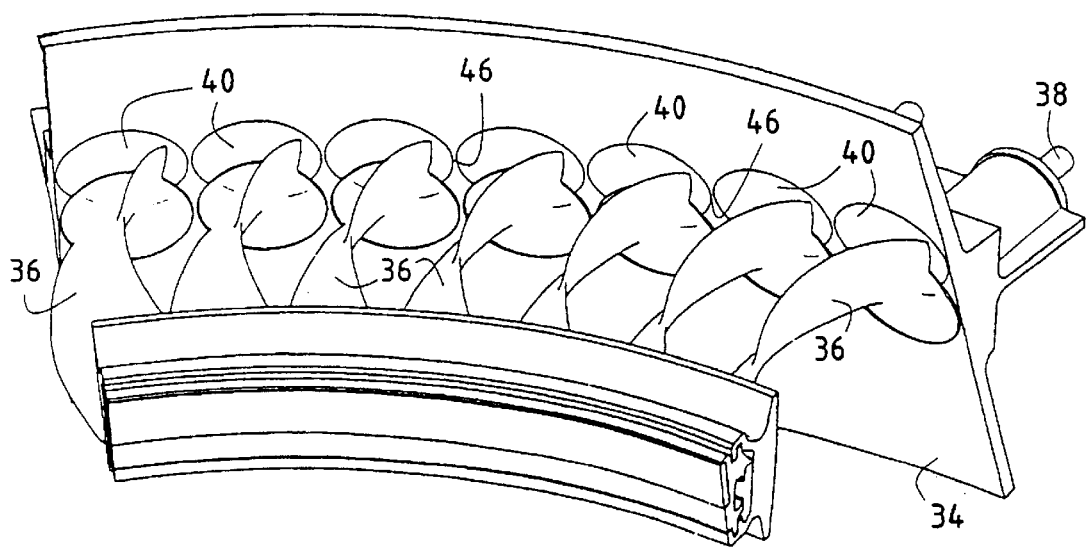
FIG. 3 is a sectional view of a turbomachine compressor stator part according to the invention.

According to the invention, an internal part of the outer wall 34 opposite an upper end of each vane 42 is machined locally (over the entire travel of this vane) so as to form a spherical portion or pocket 40 whose centre is positioned on the axis of pivoting 38 of the vane of the turbomachine, and whose radius is determined so as on the one hand to limit the depth of this pocket (obtaining the smallest possible machining height) and on the other hand to ensure, over the entire working range of operation of the vane, a minimum clearance between the upper part of this vane and the opposite part of the wall. This minimum clearance is determined so as not to create interference in the respective open and closed positions of the vanes. This localized machining, which leaves an unmachined part 46 between two adjacent spherical pockets 40 (see FIG. 3 which illustrates a compressor stage assembled straightener portion), is of course carried out for each of the vanes and for each row of vanes of the compressor stator.

Figure 2:
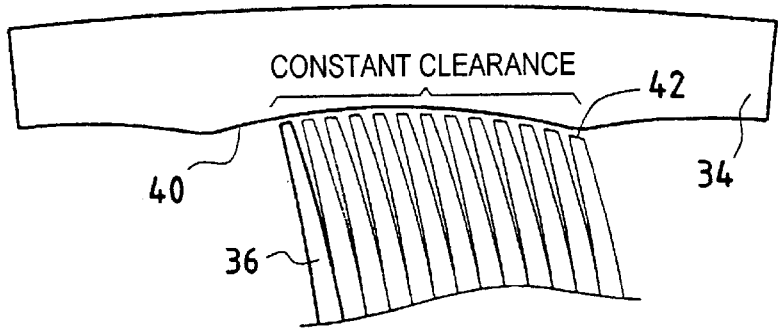
FIG. 2 is a view along A of FIG. 1 for various angular positions of a vane.

The upper end part of the vane 42 is in fact machined with a shape complementary to that of the spherical pocket 40, thus ensuring constant clearance between this upper part of the vane and the outer wall 34, as illustrated by FIG. 2 which is a view along B of FIG. 1. In a particular embodiment, this upper end part 42 corresponds to a part of the vane overhanging at the rear (or heel) which meets up with its trailing edge 44.

The comparative table below very simply summarizes the improvement obtained with the invention as compared with the prior art, with regard to the operating clearance of a vane inclined by around 12°, for angular positions lying between −10° and 30°.

| Position | −10° | 0° | 10° | 11° | 13° | 20° | 30° |
|---|---|---|---|---|---|---|---|
| Wall/vane clearance (prior art) | 0 | 0.36 | 0.90 | 0.96 | 1.10 | 1.64 | 2.56 |
| Wall/vane clearance (invention) | 0 | 0 | 0 | 0 | 0.25 | 1.27 | 2.83 |

It is thus possible, with the invention, to observe a reduction in the clearance of almost 1 mm between the wall of the outer duct and the upper part of the vane, over the entire working range of operation of the vane (between −10° and 11°), the angular region lying between 13° and 30° corresponding to a nonoptimized start-up phase. The improvement obtained is consequently particularly significant and affords an appreciable increase in the efficiency of the vane in its operating range.

What is claimed is:

1. Turbomachine compressor stator comprising a plurality of variable-pitch vanes, each vane mounted in rotation, about an axis of pivoting, in a wall forming a surface of revolution about a longitudinal central axis of rotation of the turbomachine, said axis of pivoting being inclined by a specified angle with respect to a plane perpendicular to the said longitudinal central axis, said wall being machined locally opposite an end part of each of the vanes to form a plurality of spherical pockets wherein an unmachined part is formed between adjacent spherical pockets and wherein respective centres of said spherical pocket are positioned on said axes of pivoting and have radii for ensuring, over an entire range of operation of the vanes, a predetermined minimum clearance between said end part of the vanes and said spherical portion of opposite machined wall while limiting a depth of machining of said spherical portion.

2. The compressor stator according to claim 1, wherein the said end part of the vane is machined with a shape complementary to that of the said spherical pocket so as to ensure a constant clearance between the said wall and the said end part of the vane.

3. The compressor stator according to claim 2, wherein the said wall is the outer wall, or casing, of the compressor stator, the said end part of the vane being the upper end of this vane.

4. The compressor stator according to claim 3, wherein the said upper end part is a part of the vane overhanging at the rear, also known as the heel, connected with a trailing edge of this vane.

5. A turbomachine compressor comprising a compressor stator according to any one of claims 1 to 4.

\* \* \* \* \*